United States Patent

Re. 28,379

Reissued Mar. 25, 1975

28,379

ELECTROCHEMICAL PROCESS OF COATING USING A FLUIDIZED BED

John Rayner Backhurst, Allendale, Martin Fleischmann, Chandlersford, and Francis Goodridge and Raymond Ernest Plimley, Newcastle-upon-Tyne, England, assignors to National Research Development Corporation, London, England No Drawing. Original No. 3,654,098, dated Apr. 4, 1972, Ser. No. 725,920, May 1, 1968. Application for reissue Aug. 20, 1973, Ser. No. 389,685, which is a continuation-in-part of abandoned application Ser. No. 639,803, May 19, 1967

Claims priority, application Great Britain, May 24, 1966, 23,070/66; May 9, 1967, 21,537/67

Int. Cl. C23b *5/00, 5/60;* B01k *3/00*

U.S. Cl. 204—20 15 Claims

Matter enclosed in heavy brackets [ ] appears in the original patent but forms no part of this reissue specification; matter printed in italics indicates the additions made by reissue.

ABSTRACT OF THE DISCLOSURE

Particularly for use in a fluidised particle electrode for an electrochemical cell such as a zinc/air battery, a method of producing particles of substantially uniform shape comprises electrochemically depositing surface metal on to substantially uniform particles which form a fluidised bed electrode in a plating bath.

The particles may comprise non-metallic cores which are coated with a thin metallic coating electrolessly, or by a vacuum deposition technique, before being introduced into the plating bath.

*Cross Reference to Related Application*

*This application is a continuation-in-part of Ser. No. 639,803, filed May 19, 1967 (abandoned).*

This invention relates to electrochemical processes and particularly to electrodeposition processes.

As in most chemical reactions depending upon a surface effect, the reactivity of an electrochemical cell used for such a reaction is largely dependent upon the active area of the surface at which the reaction takes place, that is to say, the larger the active surface area of an electrode per unit volume of the cell, the higher the current that can be supported by a given volume of the cell. For that reason, an electrode has been devised in accordance with the invention disclosed in co-pending patent application Ser. No. 639,803, and now abandoned, and according to that invention, the electrode takes the form of a fluidised bed of conducting and/or semi-conducting particles. In order to carry out reactions at an electrode of this kind, it is advantageous to be able to use particles of substantially spherical shape and the earlier experiments were conducted with copper particles but copper particles of uniform shape greater than about 150 microns are not readily produced. It is an object of the present invention to provide a convenient way of producing particles for use in electrodes of this kind, and more especially where, the electrode is to form the anode of an oxygen (air) depolarised consumable anode cell. In the latter case, a consumable material is required for the cell and it is convenient to have powder particles of reasonable size greater than 150 microns.

In accordance with the invention, a method of producing particles having metal surfaces of substantially uniform shape comprises electrochemically depositing the surface metal onto substantially uniform particles forming a fluidised bed electrode in a plating bath. Thus the particles to be coated may be metallic, or alternatively glass, or plastics, spheres, themselves coated to a very small thickness by, say, an electroless plating technique.

The metal of which the base spheres are formed, or the metal coating of the non-metallic spheres may, of course, be different from the metal to be electrodeposited; but preferably the cathode current feeder in the electroplating bath is of the same metal as the base spheres themselves or the coating on the non-metallic base spheres. The amount of metal deposited using the fluidising technique is far greater and more uniformly put down than by the electroless method.

The electrode arrangements in the plating cell can take any convenient form and may, for example, be concentric cylinders, or plane parallel, or the secondary electrode can be immediately above the fluidised electrode, which forms the cathode of the cell. The cell may operate with or without a diaphragm and may operate over a range of temperatures. The particular plating electrolyte will depend upon the metal to be deposited.

For a fluidised electrode metal/air cell, the electrodeposited metal will be zinc or other suitable metal. Several advantages accrue from the use of the fluidised consumable anode but, unless means can be found of replacing the consumed anodic material of the particles, the cell becomes useless when the anodic material is spent. The spent particles could be removed and could be replaced by a supply of new particles; the spent particles being subsequently reformed independently of the cell; if the particles are of only small diameter they would become spent comparatively quickly and, if the coating of the non-metallic particles were to be thin, there would be similarly a rapid consumption of the reactant metal.

The present invention enables substantially uniformly coated particles to be produced with high efficiency and in a predictable manner. Thus, glass beads have been used, first coated with a base metal, such as copper, electrolessly and then, in the form of a fluidised electrode in a plating cell, these have had zinc deposited on them to the extent of, in some cases, almost 50% of their weight. There is no reason to believe that even larged densities cannot be effected with increased processing time. Again suitable plastics or metallised plastics beads may be used instead of glass.

In one particular embodiment of this invention, which is given by way of example, glass beads of about 500 microns diameter, are first treated to prepare the surface. The beads, in effect, form a powder and this powder is thoroughly cleaned and degreased at 50° C. using the detergent known as Decon 75. After several washings with distilled water, the powder is agitated in a 1:1 solution of 1% aqueous silver nitrate and ethanol for five minutes at room temperature. This produces an adsorbed layer on the surface which acts as a catalyst in the subsequent reduction of the metal. After this treatment the powder is dried at 40° C.

The plating solution (Solution 1) is prepared by mixing 180 gms. of glycerol with 1 litre of 20% sodium hydroxide solution with the final addition of 180 gms. of cupric carbonate. This solution is allowed to stand for at least a day before use. Approximately 10 gms. weight of the pre-treated powder is placed in 110 ml. of Solution 1. 24 ml. of a 28% solution of formaldehyde as a reducing agent, are then added and the mixture is agitated until the initial reaction has subsided. The mixture is then allowed to stand, with occasional agitation, until no further reaction is evident. Copper is laid down uniformly on the surfaces of the particles.

The coated spheres are then well washed with distilled water followed by 5% sulphuric acid. They are then preferably dried at 50° C. in an atmosphere of nitrogen to prevent oxidation of the coating.

By the pre-preparation described, complete covering of the surfaces of the particles is ensured and it also leads to good adhesion to the glass.

The copper-coated beads are then placed as a bed to form a cathode in a cylindrical cell of suitable dimensions and conforming to the invention described in the specification accompanying co-pending patent application Ser. No. 639,803 above referred to, to be coated with zinc. The current feeder to the cathode bed is of copper. A nickel anode in a form of a spiral is placed in the cell into which a stream of 2 N potassium hydroxide with zinc sulphate is introduced, the anode being situated immediately above the bed. The stream of electrolyte is regulated so as to fluidise the bed to the extent of expanding it by about 50 percent of its settled depth. The cell is operated at room temperature.

A current density of 3 ma./cm.$^2$ calculated on the true superficial area of particles surface operating for a duration of three hours would deposit approximately 4.5 gms. of zinc on 10 gms. of copper-coated particles. In this way it has been found possible to obtain a plating efficiency of 90% and there is no reason to believe that this figure cannot be improved upon.

In another embodiment of this invention, glass beads of similar sizes to those in the preceding example, are prepared and dried as above described and are then coated with a layer of nickel approximately 10 microns thick by any known similar electroless process. These nickel-coated beads are then introduced into a cylindrical cell as a cathode bed on a porous distributor plate as described in the specification accompanying the co-pending patent application referred to above, the current feeder taking the form of a nickel or copper spiral. A platinum spiral arranged immediately above the cathode bed, allowing for fluidisation of the latter, functions as anode for the plating process.

The electrolyte used for the cell may be prepared by taking 315 ml. of lead fluoroborate solution (S.G.=2.20) and adding 0.5 gm. of gelatine previously dissolved in a little hot water, the solution being vigorously stirred. Then 0.1 gm. of resorcinol dissolved in a little methanol is added to the mixture and the volume is made up with distilled water to make 1 litre of electrolyte. This solution has a slightly milky appearance but this is of no consequence in the plating process.

With the cell operating at near room temperature (say 20° C.) current densities up to about 20 amp./ft.$^2$ can be achieved during plating.

Working at current densities of about 10 ma./cm.$^2$ and with a bed of 20 gm. of particles separated by about 50 percent, about 8 amp. is carried at a cell voltage of about 5 volts. Approximately 2.8 gm. of lead were deposited on the particles in about 15 minutes without dendrite bridging formations.

An important point about particles plated in accordance with the invention is that they will be found to possess the similar shape to the original particles and no dendrites will be formed if the fluidisation is wholly effective. By this means, it is possible to produce well regulated particles of desired dimensions.

A particular point to note about metal-carrying non-metallic base particles is that, because of their relatively low density, the resultant powder is more readily fluidised, because a lower fluidising velocity is required.

It is desirable that there should be sufficient difference between the specific gravities of the particles and the electrolyte to enable the particles to be agitated during fluidisation as, otherwise, there is a tendency to agglomeration of the particles. By reason of the differing specific gravities e.g. polystyrene, approximately 1.1; glass, approximately 2.5; and copper, approximately 8.9—it is possible to arrive at any desired bulk density of each particle within a wide range. This enables one to select an appropriate fluidising velocity in the cell. It will be evident that when the coated particle is used in a metal/air cell, the coating will depend upon the performance desired but this need not be elaborated here. Conditions suitable for the preparation of particles coated with appropriate metals will be evident to those skilled in this art. The invention is of particular advantage for the production of particles for use in the proposal for a fluidised bed electrode in a metal/air cell as described in the specification accompanying co-pending patent application Ser. No. 712,640.

We claim:

1. A method of producing particles having thereon a metal surface [of substantially uniform shape] which comprises:

(a) providing an electrochemical cell which includes a cathodic chamber containing a quantity of [substantially uniform] electroplatable particles forming a static bed at the base of said chamber, said base incorporating means for producing uniform flow of liquid across the area of said chamber upon upward flow of liquid through the chamber, (b) causing liquid electrolyte to enter said chamber at the base thereof, (c) causing said liquid electrolyte entering said chamber to flow through said base means and flow upwardly in said chamber in a vertical direction at a velocity that causes said static bed of particles to expand to a substantially uniform depth by levitation of said particles so that the resulting fluidised bed occupies a volume [about 50%] greater than said static bed.

(d) arranging for electrode means to contact particles in said fluidised bed, and (e) passing electric current through said cell via said electrode means so as to cathodically deposit metal on said particles.

2. A method as claimed in claim 1 wherein said particles have a non-metallic core.

3. The method of claim 2 wherein the non-metallic core is glass.

4. The method of claim 2 wherein the non-metallic core is plastic.

5. A method as claimed in claim 1 wherein said particles consist of a non-metallic core thinly coated with electroless deposited metal.

6. The method of claim 5 wherein the non-metallic cores of said particles have been metallized by a vacuum deposition of metal.

7. The method of claim 6 wherein said vacuum deposited metal is different from the surface metal of the particles.

*8. The method of claim 1 wherein said particles are powdered metal particles.*

*9. In an electrolytic cell having parent and counter electrodes separated by an ion permeable diaphragm and a wide-area bed of conductive particles surrounding at least a portion of said parent electrode, the method of carrying out electrochemical processes in which current flows between said parent and counter electrodes comprising:*

*flowing a mixture of electrolyte and electrochemical reactant up through a wide expanse of said bed of conductive particles at a rate sufficient to maintain said bed in a fluidized condition;*

*passing an external electrical current between said parent and counter electrodes while said mixture is flowing; and*

*recovering the electrochemical products produced by current flow between said conductive particles, said parent electrode and said counter electrode from the overhead effluent stream from said electrolytic cell.*

*10. In an electrolytic cell having parent and counter electrodes separated by an ion permeable diaphragm and a wide-area bed of conductive particles surrounding at least a portion of said parent electrode, the method of producing metal powders in which current flows between said parent and counter electrodes comprising:*

*flowing a mixture of electrolyte and reactant material through said bed of conductive particles at a rate sufficient to maintain a wide area of said bed in a fluidized condition;*

*passing an external current between said parent and counter electrodes while said mixture is flowing;*

*providing a fresh supply of conductive particles; and recovering said conductive particles.*

*11. In an electrolytic cell having parent and counter electrodes separated by an ion permeable diaphragm and a bed of conductive particles in contact with at least a portion of said parent electrode, the method of carrying out electrochemical processes in which current flows between said parent and counter electrodes comprising:*

*flowing a mixture of electrolyte and electrochemical reactant up through said bed of conductive particles at a rate sufficient to maintain said bed in a fluidized condition and*

*passing an external electrical current between said parent and counter electrodes while said mixture is flowing*

*thereby producing electrochemical products by current flow between said conductive particles, said electrode and said counter electrode.*

*12. In an electrolytic cell having parent and counter electrodes separated by an ion permeable diaphragm and a bed of conductive particles in contact with at least a portion of said parent electrode, the method which comprises:*

*flowing a mixture of electrolyte and reactant material through said bed of conductive particles at a rate sufficient to maintain said bed in a fluidized condition;*

*passing an external current between said parent and counter electrodes while said bed is in fluidized condition and*

*providing a further supply of conductive particles to said bed whereby to replace particles initially in said bed.*

*13. The method of claim 12 in which metal powders are produced by current flow between said conductive particles, said electrode and said counter electrode.*

*14. A method of producing particles having thereon a metal surface which comprises*

*(a) providing an electrochemical cell which includes a cathodic chamber having a base incorporating means for producing uniform flow of liquid substantially across the area of said chamber upon upward flow of liquid through the chamber,*

*(b) providing a quantity of electroplatable particles within said chamber,*

*(c) causing liquid electrolyte to enter said chamber at the base thereof to flow upwardly in said chamber in a vertical direction at a velocity that causes said particles to assume a fluidized condition occupying a substantially uniform volume of said chamber greater than the volume that would be occupied by said particles in a static condition and less than the total volume of said chamber,*

*(d) arranging for electrode means to contact particles in said fluidized condition, and*

*(e) passing electric current through said cell via said electrode means so as to cathodically deposit metal on said particles.*

*15. The method of claim 14 wherein said particles are metal particles.*

References Cited

The following references, cited by the Examiner, are of record in the patented file of this patent or the original patent.

UNITED STATES PATENTS

| | | | |
|---|---|---|---|
| 3,577,324 | 5/1971 | Patterson | 204—23 |
| 3,703,446 | 11/1972 | Haycock et al. | 204—23 |
| 521,991 | 1894 | Sachs et al. | 204—10 |
| 1,789,443 | 1/1931 | Levin | 204—201 |
| 2,683,686 | 7/1954 | Matsukawa | 204—23 |
| 3,428,543 | 2/1969 | Weber | 204—23 |
| 2,939,804 | 6/1960 | Schossberger | 117—100 |

FOREIGN PATENTS

| | | | |
|---|---|---|---|
| 176,774 | 4/1966 | U.S.S.R. | 204—222 |
| 6712385 | 3/1968 | Netherlands | 204—23 |

T. M. TUFARIELLO, Primary Examiner

U.S. Cl. X.R.

204—23, 222, 275